United States Patent
Mullard et al.

(10) Patent No.: US 7,250,578 B2
(45) Date of Patent: Jul. 31, 2007

(54) MULTIFUNCTION SWITCHING ARRANGEMENT FOR CONTROLLING TRANSMISSION OVERDRIVE AND AUTOSTICK FUNCTIONS

(75) Inventors: Bruce Mullard, Vestaburg, MI (US); Chad Edward Brott, Fremont, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 11/235,690

(22) Filed: Sep. 26, 2005

(65) Prior Publication Data

US 2006/0219535 A1  Oct. 5, 2006

Related U.S. Application Data

(60) Provisional application No. 60/640,199, filed on Dec. 29, 2004.

(51) Int. Cl.
*H01H 9/00* (2006.01)
*H01H 27/06* (2006.01)

(52) U.S. Cl. .................... 200/61.54; 200/339

(58) Field of Classification Search .............. 200/61.54
See application file for complete search history.

(56) References Cited

U.S. PATENT DOCUMENTS

| 5,610,378 | A | * | 3/1997 | DuRocher et al. | ....... 200/61.54 |
| 5,780,794 | A | * | 7/1998 | Uchiyama et al. | ....... 200/61.54 |
| 5,854,458 | A | * | 12/1998 | Ramamurthy et al. | ... 200/61.54 |
| 6,260,431 | B1 | * | 7/2001 | Yokoyama | ............... 74/469 |

* cited by examiner

*Primary Examiner*—Elvin Enad
*Assistant Examiner*—Lheiren Mae A. Anglo
(74) *Attorney, Agent, or Firm*—John R. Benfiel; Dean B. Watson

(57) ABSTRACT

A multifunction switching arrangement for an electronic transmission control which includes a button on a knob casing which can be moved in opposite circumferential directions and alternatively operates two switches in the assemblage which in turn causes an upshift or downshift of the transmission. When a button is advanced in an axial direction, a third switch is operated to activate or deactivate the transmission overdrive. in one embodiment only a single button is moved to operate all three switches, while in two other embodiments a separate push button in the end of the knob casing is used to control the third switch.

12 Claims, 11 Drawing Sheets

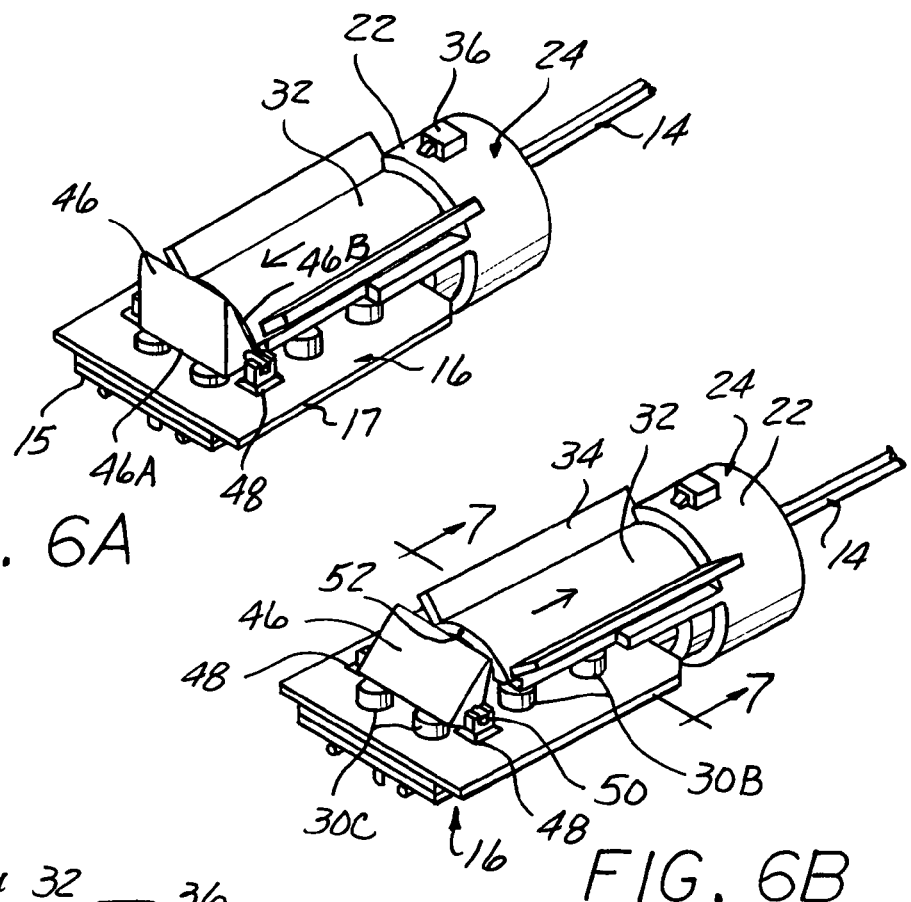
FIG. 6A
FIG. 6B
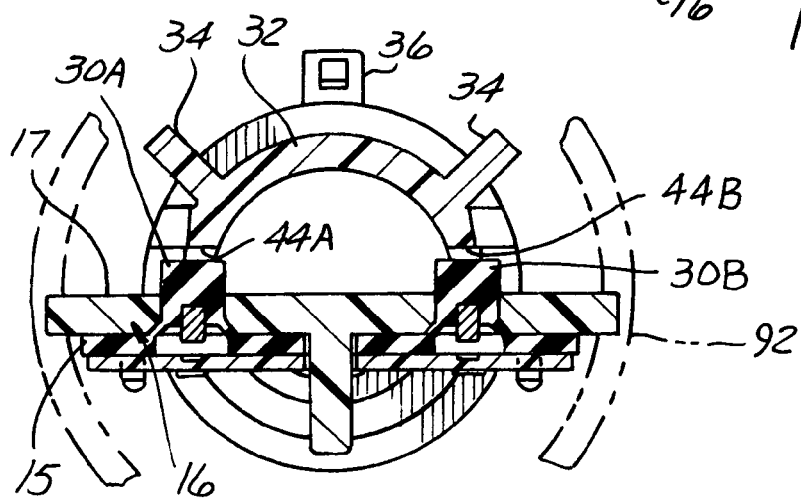
FIG. 7

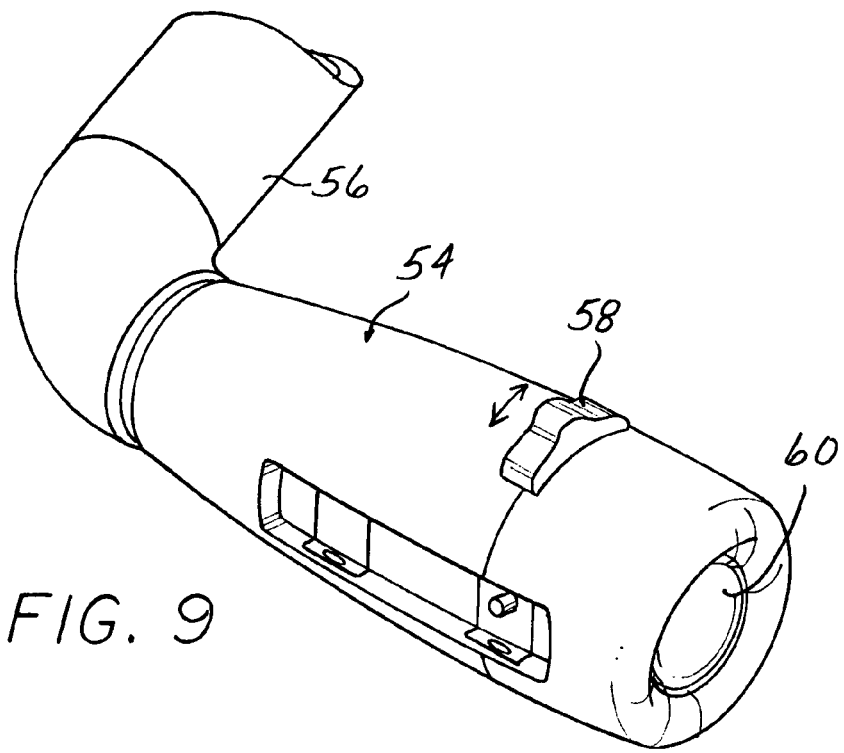
FIG. 9
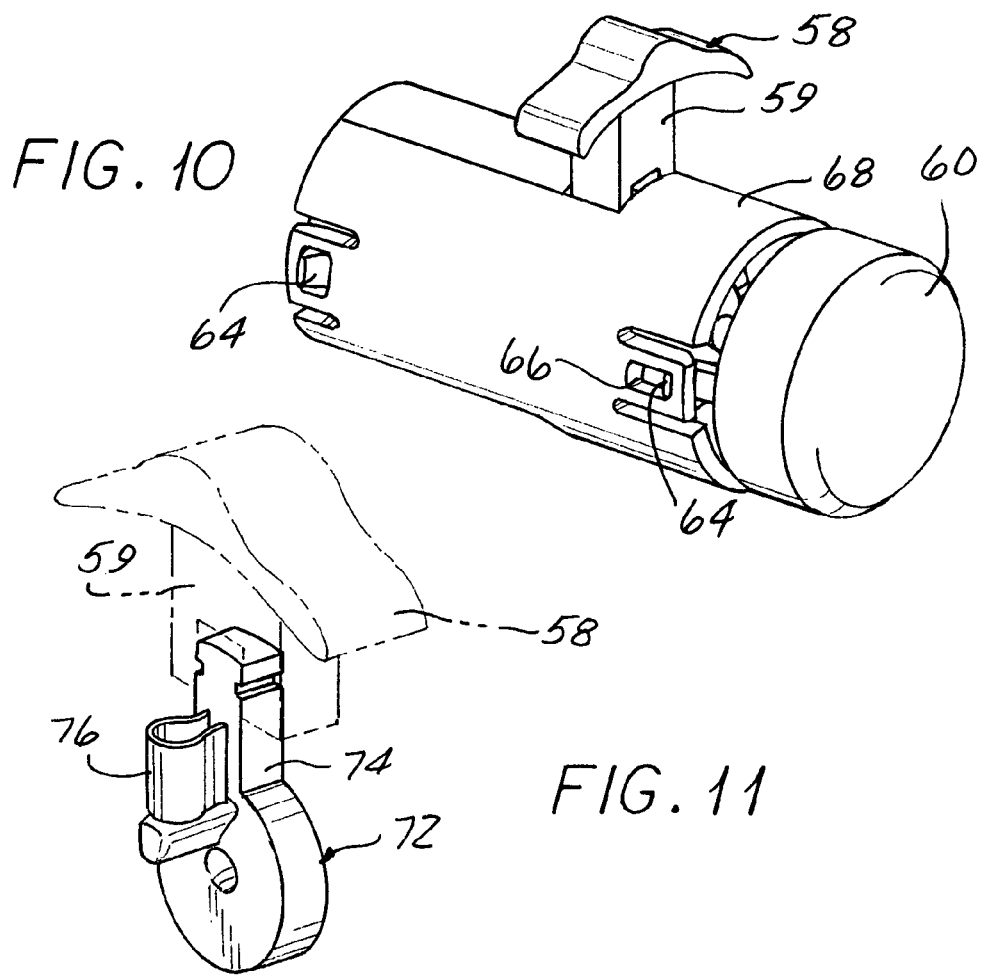
FIG. 10
FIG. 11

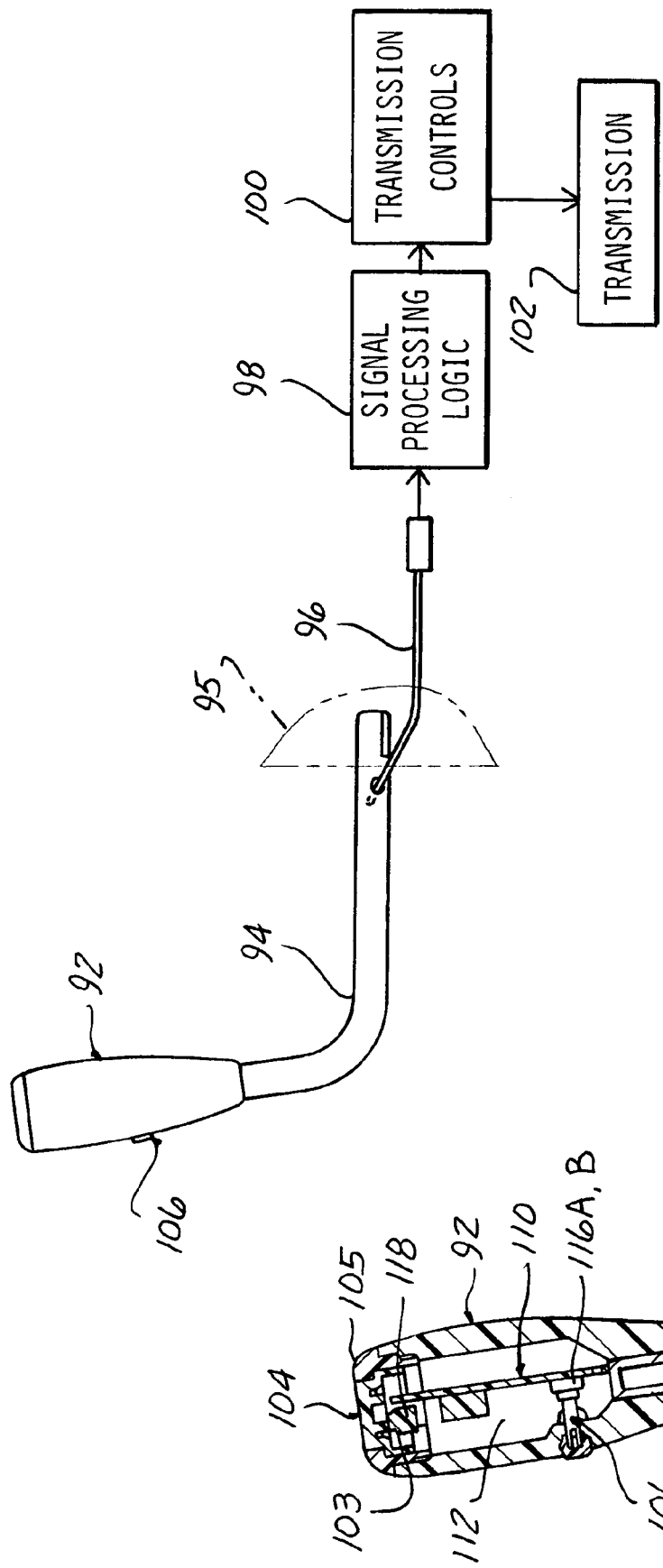

MULTIFUNCTION SWITCHING ARRANGEMENT FOR CONTROLLING TRANSMISSION OVERDRIVE AND AUTOSTICK FUNCTIONS

CROSS REFERENCE TO RELATED APPLICATIONS

This application claims the benefit of U.S. provisional application Ser. No. 60/640,199, filed Dec. 29, 2004.

BACKGROUND OF THE INVENTION

This application concerns controls for automotive transmissions and more particularly for electronically controlled automatic transmissions which allows manual changing of gears.

Most electronically controlled automatic transmissions allow overdrive to be selectively turned on or off by a separate push button operated switch.

Transmissions have often been equipped with an "autostick" capability which allows manual upshifting or downshifting of the transmission by movement of a selector lever.

A steering column mounted lever has in the past been equipped with a push button on a knob at the end of the lever for controlling the actuation of overdrive with a switch inside the knob operated by the button.

It has been considered desirable to also allow upshifting or downshifting by operating switches on the steering column lever to allow quicker shifting.

It would be desirable to reduce the cost of such controls by combining the switches controlling those two functions into a single assemblage so that fewer components would be necessary to be assembled into the lever.

It is the object of the present invention to provide a steering column lever mounted multifunction switching arrangement able to control autostick and overdrive activation.

SUMMARY OF THE INVENTION

The above object and other objects which will become apparent upon a reading of the following specification and claims are achieved by a switch assemblage installed as a single unit into one end of a hollow knob casing on a steering column mounted lever, which includes a plurality of switches, one of which when operated turns the overdrive on or off, and two other switches which when operated cause an upshift or downshift of the transmission.

In a first embodiment, a single slide button is mounted protruding from one side of the knob casing and is shiftable axially to engage a pivoted switch actuator in turn engaging buttons operating circuit board mounted switching or to activate or deactivate the overdrive function.

The single slide button is also shiftable on the knob case in either circumferential direction and engaged with a switch actuator mounted in the knob casing allowing oscillation. The switch actuator has opposite portions respectively engaging switch elements included in the circuit board assembly to be alternatively contacted by oscillation of the switch actuator in either direction, respectively causing an upshift or downshift of the transmission.

In a second embodiment, a push button on an end of a knob casing operates a spring disc element which closes an overdrive activation circuit when deflected inwardly. A rotary button on one side of the lever knob case may be momentarily shifted in either circumferential direction against the bias of a centering spring and thereby oscillates a switch member in either direction causing a contact glide mounted thereto to contact either of two slide contacts which when contacted by the contact glide close a circuit causing the transmission to be shifted up or down one gear level.

In a preferred third embodiment, a circuit board comprising a switch assembly having three separate switches is assembled into one end of the knob casing.

A rocker switch is snap fit into a side opening of the knob casing able to be oscillated therein to bring either of two prongs into engagement with a respective one of two switch buttons on the circuit board. This enables shift up or down of the transmission gear.

A switch button is captured in a cap on the end of the lever casing which can be pressed into contact with a third switch on an outer end of the circuit board which when operated turns the transmission overdrive on or off.

DESCRIPTION OF THE DRAWING FIGURES

FIG. 6A is a pictorial view of the circuit board assembly and actuator components shown in FIG. 5 in a position as assumed in an axially advanced position of the switch button.

FIG. 6B shows the components in a position assumed when the switch button is released.

FIG. 7 is a view of the section 7-7 taken in FIG. 6B.

FIG. 9 is a pictorial view of a knob casing of a second embodiment of a multifunctional switching arrangement according to the present invention.

FIG. 10 is a pictorial view of a switch assembly included in the second embodiment of the invention.

FIG. 11 is a pictorial view of a switch lever included in the switch assembly of FIG. 10 with a rotary switch and slide button shown assembled thereto in phantom lines.

FIG. 14 is a plan view of a steering column mounted lever and knob casing assembly housing a third embodiment of a switching assembly according to the present invention.

FIG. 15 is a sectional view of the lever and knob casing shown in FIG. 14 showing the internal components.

DETAILED DESCRIPTION

Figure 1:
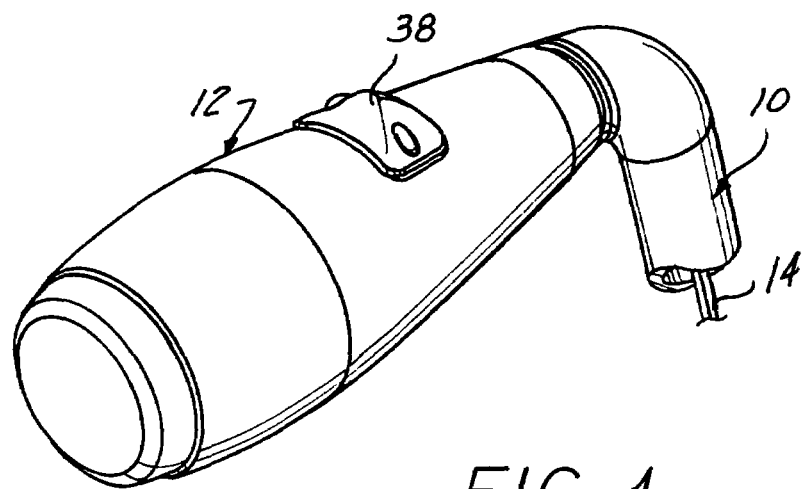
FIG. 1 is a fragmentary view of a steering column mounted lever with a hollow knob casing at the free end housing a first embodiment of a multifunction switching arrangement according to the present invention with a block diagram representation of the associated transmission components.
Figure 2:
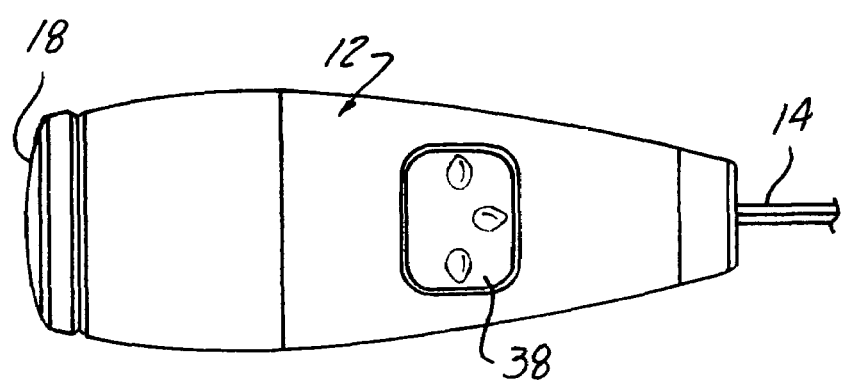
FIG. 2 is a top view of the lever knob casing shown in FIG. 1.
Figure 3:
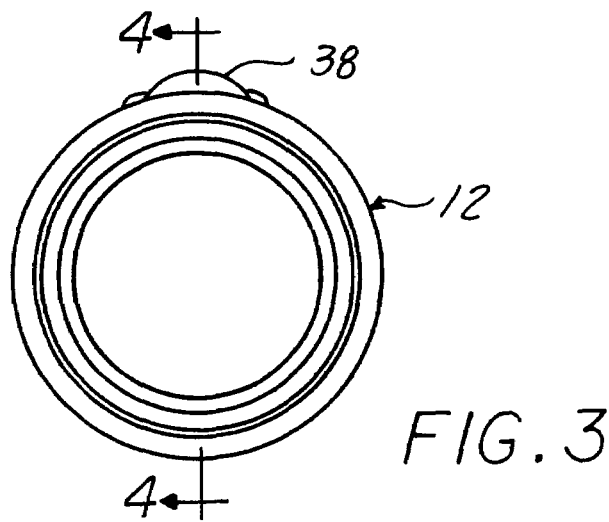
FIG. 3 is an end view of the knob casing shown in FIG. 2.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, FIGS. 1-8B depict a first embodiment of a multifunction switching arrangement according to the invention, which is associated with a lever 10 having a hollow knob casing 12 at its free end. An electrical cable 14 is routed within the lever 10 and knob casing 12 to a circuit board assembly 16 installed within an internal space 13 in the knob casing 12 by being inserted through a larger open end prior to assembling a cap 18 therein.

The circuit board assembly 16 is nonrotatably held in lengthwise slots extending along the internal space 13 of the knob casing 12.

An integral annular portion 20 of a circuit board holder plate 21 included in the circuit board assembly 16 is slidably received in a collar 22 integral with a switch actuator 24, collar 22 in turn rotatable on a boss 26 formed in the inside of the knob casing 12 projecting into the internal space 13.

A stepped opening 28 in the knob casing 12 and boss 26 is aligned with the inside diameter of the collar 22 and annular portion 20 to allow the cable 14 to pass to the circuit board 15 included in the circuit board assembly allowing it to be connected thereto.

The circuit board 15 has three pairs of switches mounted thereto, each operated by a pair of resiliently compressible elements 30A, 30B, and 30C integral with an elastomeric layer 17 held on the plate 21.

Figure 4:
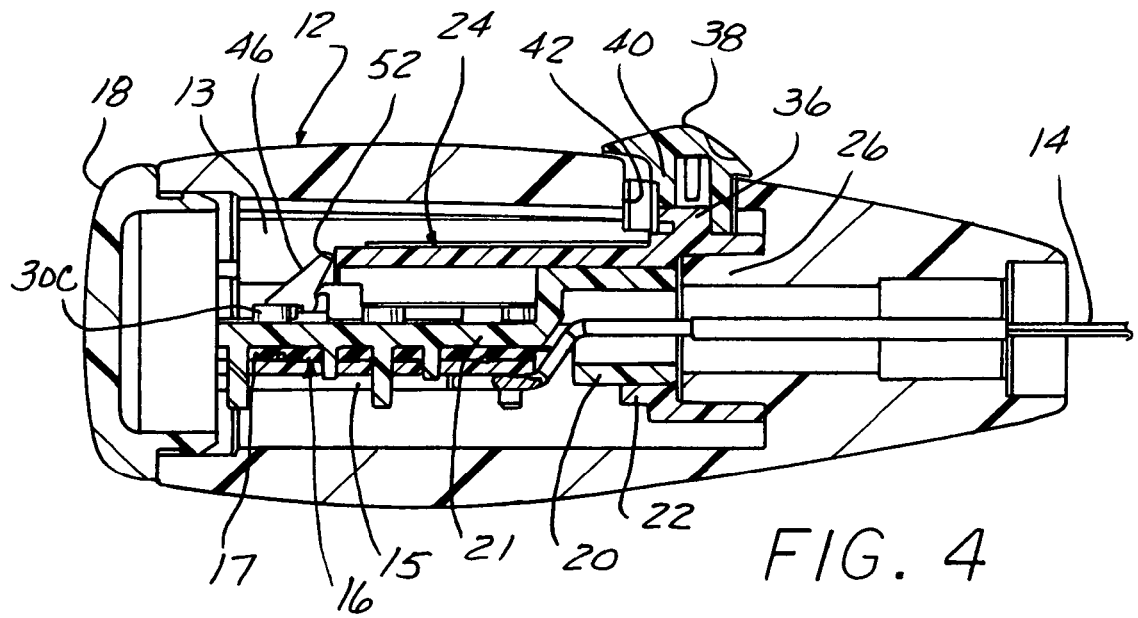
FIG. 4 is a view of the section 4-4 taken in FIG. 3.
Figure 5:
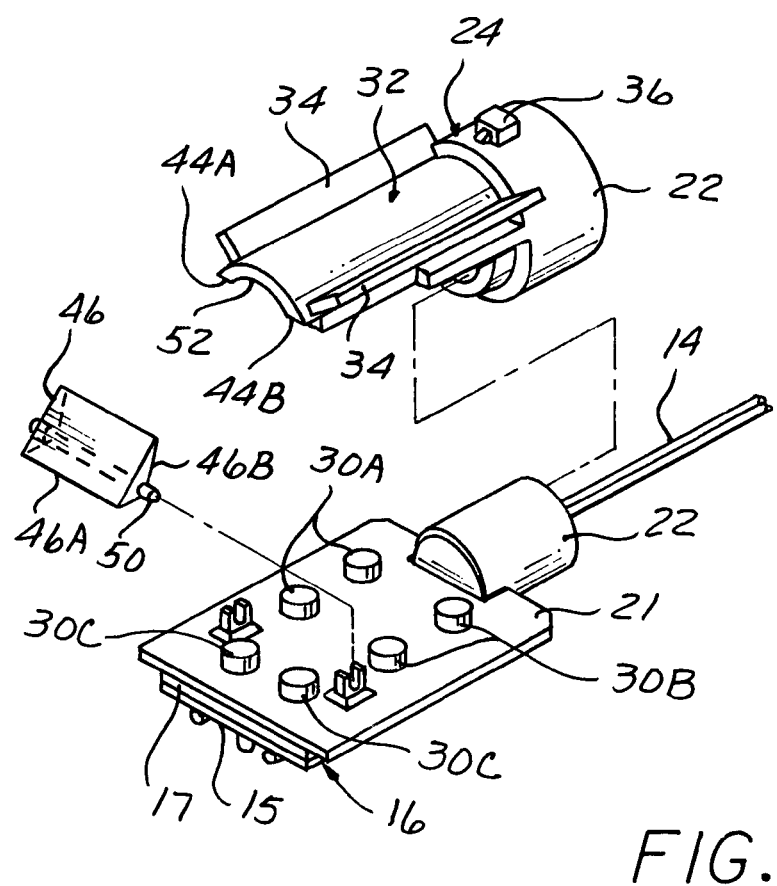
FIG. 5 is an exploded pictorial view of a circuit board assembly and switch actuator included in the first embodiment of the multifunction switching arrangement according to the invention.
Figure 8A:
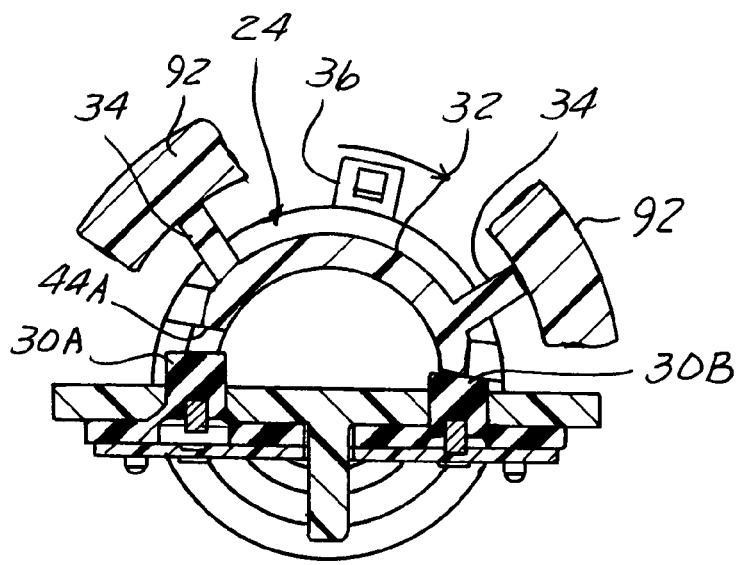
FIG. 8A is a sectional view of the components shown in FIG. 7 in the position assumed with the switch button shifted circumferentially in one direction.
Figure 8B:
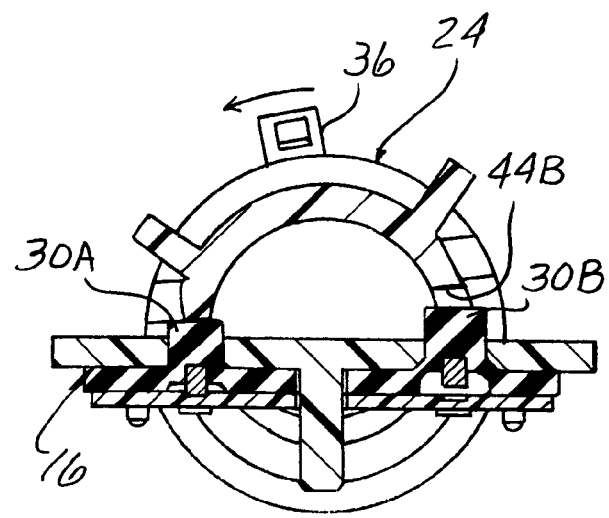
FIG. 8B is a sectional view of the components shown in FIG. 7 in the position assumed with the switch button shifted circumferentially in the opposite direction from that shown in FIG. 8A.
Figure 16:
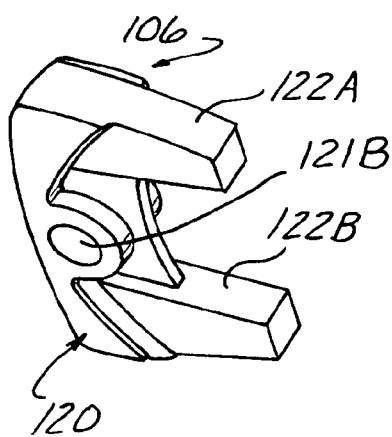
FIG. 16 is a pictorial view of an up-down shift controlling rocker button included in the third embodiment of the invention.
Figure 17:
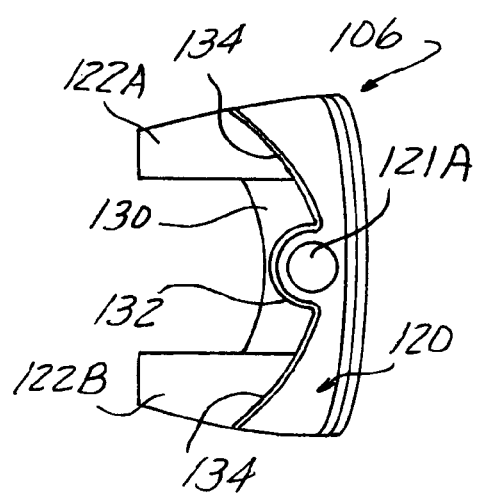
FIG. 17 is an enlarged left side view of the rocker button shown in FIG. 16.
Figure 12:
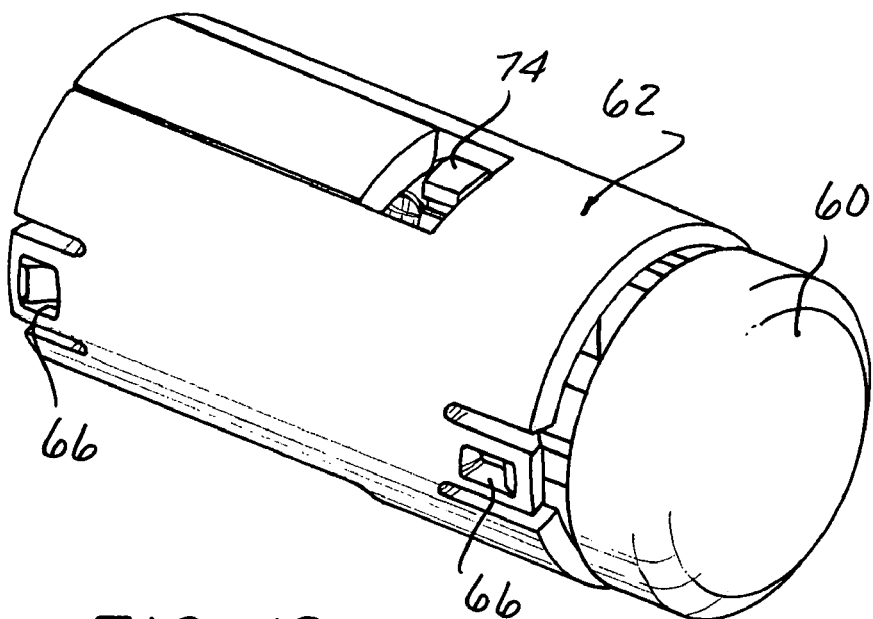
FIG. 12 is a pictorial view of the switch assembly insert with the slide button removed.

The switch actuator 24 includes an arcuate body 32 projecting axially from the collar 22. A pair of axial ribs 34 project radially therefrom which engage the inside wall of the knob casing 92 when the actuator 24 is rotated to engage either pair of elements 30A or 30B as seen in FIGS. 8A, 8B. The arcuate body 32 is able to oscillate within the internal space 13 by the collar 22 being rotatable on the boss 26 (FIG. 4).

A locking tab 36 projects from the collar 22 which is detachably connected to a slide button 38 having a stem 40 inserted into an opening 42 in the sidewall of the knob casing 12.

The arcuate body 32 is shaped as a segment of a tube creating a pair of axially extending end edges 44A, 44B positioned over respective pairs of switching elements 30A, 30B so as to alternatively engage the same as the switch actuator 24 is oscillated in either direction by corresponding movement of the slide button 38, as indicated in FIGS. 8A and 8B.

An angled switch piece 46 is pivotally supported on integral pivot supports 48 receiving integral axle pins 50 on the piece 46.

The angled switching piece 46 has one face 46A located over the third pair of switch elements 30C and another face 46B opposite one end face 52 of the switch actuator body 32. The opening 42 is large enough to allow the slide button 38 to be moved axially to advance the actuator body 32 sufficiently to compress the switch element 30C or to be moved circumferentially to oscillate the actuator body 32 to alternatively compress elements 30A or 30B. Each of the resilient elements 30A, B, C generate a restoring force to return the actuator 24 to a rest position when the slide button 38 is released.

FIGS. 9-13B show details of a second embodiment of a multifunction switching arrangement according to the present invention.

This embodiment is also installed in knob casing 54 fixed to the end of a steering column mounted lever 56. A slide button 58 is movable in either circumferential direction as indicated in FIG. 9, which causes an upshift or downshift of the transmission, respectively as described above.

A push button 60 is recessed into the free end of the knob casing 54 which when depressed causes the overdrive function to be turned on or off, also as described above.

The switch arrangement includes a switch assembly 62 (FIGS. 10 and 12) installed as unit into the knob casing 54, held therein with snap fingers 64 received in receptacles 66 in an outer housing sleeve 68 of the switch assembly 62.

The button 58 has a stem 59 attachable to a stem 74 on a rotatable contact slide member 72 by interfit grooves as seen in FIG. 11.

Figure 13:
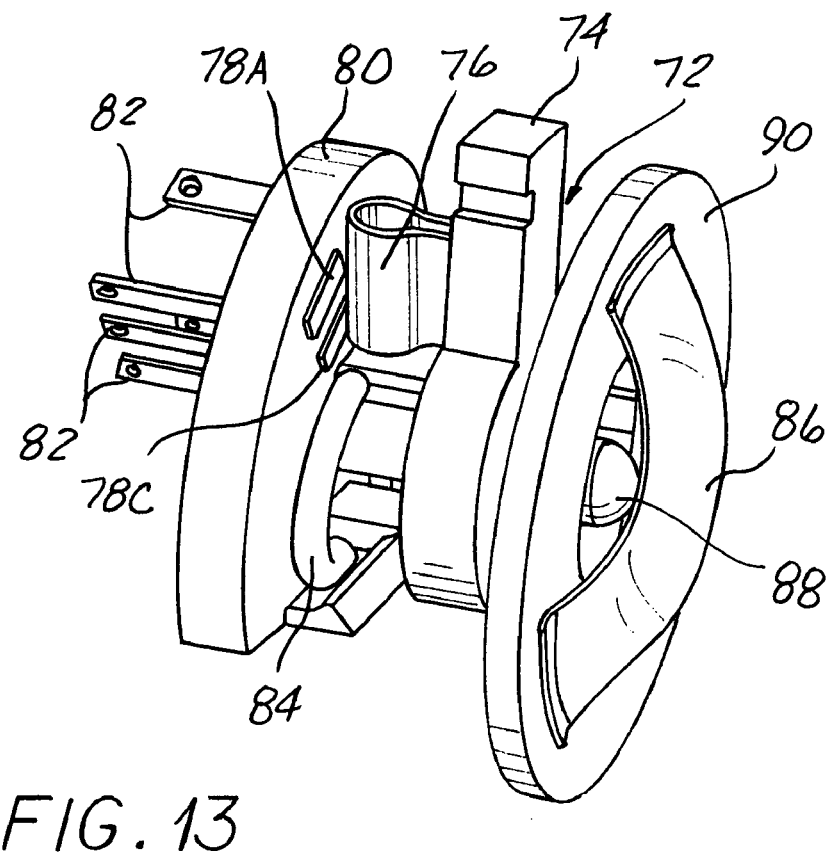
FIG. 13 is a pictorial view of the switch contact components included in the switching assembly shown in FIGS. 10 and 12.
Figure 13A:
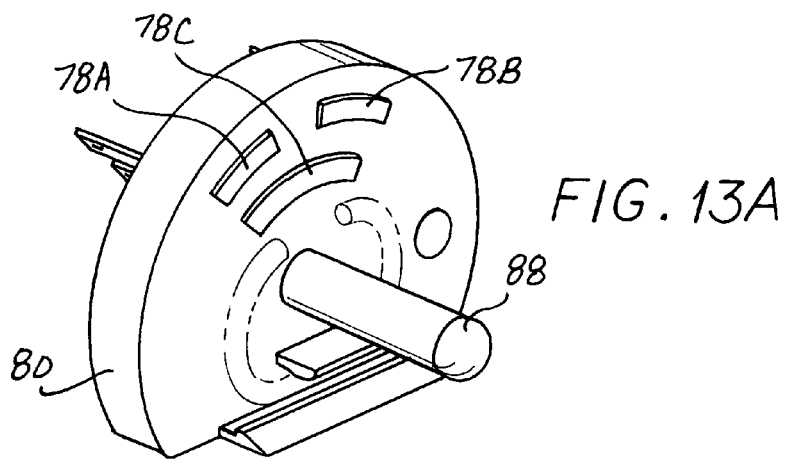
FIG. 13A is a pictorial view of the disc segment and overdrive terminal shown in FIG. 13.
Figure 13B:
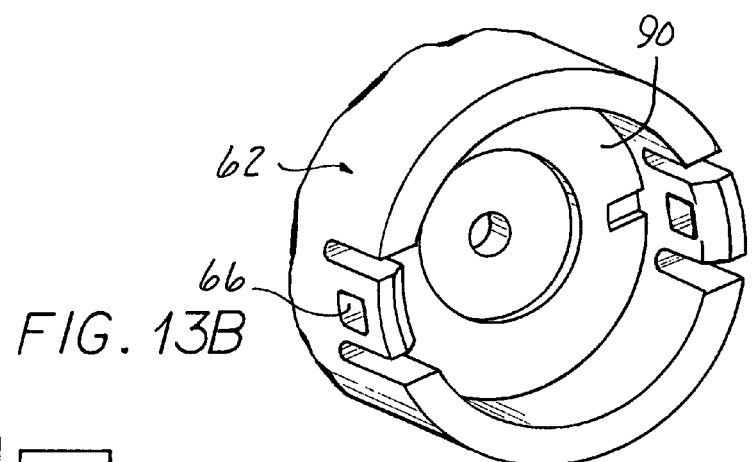
FIG. 13B is a fragmentary view of one end of a knob casing housing the switch assembly components shown in FIG. 13 showing an annular connector disc installed therein.

A contact slide 76 makes contact with conductive strips 78A, B, C (FIG. 13A) molded into a disc segment 80 when shifted in respective circumferential directions, the contact strips 78 connected to terminals 82 to accomplish a switching function sensed by suitable signal processing logic circuitry (not shown).

An arcuate return spring 84 engages each side of member 72 to maintain member 72 in a centered neutral position when released.

A spring disc 86 mounted to an annular connector disc 90 is engaged by push button 60 and makes contact with another contact on a contact post 88 centered in the annular terminal disc 90 (FIGS. 13, 13B) to establish an electrical connection.

Terminals 82 are adapted to be mated to a connector fitting (not shown) to be electrically connected to the contacts 78A, B, C and 80, 90 and thereby to the signal processing logic circuitry to create an upshift or downshift when the button 58 is shifted in respective directions.

Referring to FIGS. 14-29, a third preferred embodiment of the multifunctional switch arrangement according to the invention is shown.

The third embodiment is similar to the other embodiments in that it is housed in a knob casing 92 attached to the free end of lever 94 mounted to a steering column 95. A cable 96 is routed through the hollow lever 94 and into the knob casing 92.

The cable 96 is connected to signal processing logic circuitry 98 which generates control signals transmitted to transmission controls 100 which electronically controls the shifting of a transmission 102 in conventional fashion.

A push button 104 is recessed in an opening in the cap 105 installed into the knob casing 92. When the button 104 is depressed, this operates a switch described below to turn the overdrive function on or off.

A rocker button 106 is received in a slot 108 in the sidewall of the knob casing 92. The rocker button 106 protrudes inwardly towards a circuit board 110 mounted within the interior space 112 in the knob casing 92.

The circuit board 110 is held in a pair of lengthwise grooves 114 in the larger diameter section of the space 112, the taper of the space 112 matched to the tapered sides of the circuit board 110 to be wedged against the smaller tapered diameter end of the space 112.

A connector fitting 109 allows connection of the cable 96.

A pair of switches 116A, 116B are mounted facing upwardly on one side of the circuit board 112, having resiliently deflectable operator elements, suitable such switches being commercially available.

An additional switch 118 is mounted on an end of the circuit board 110 having a resiliently deflectable element facing out towards the push button 104.

The push button 104 has an annular ridge 120 always having one segment aligned with the switch 118 no matter how turned such as to insure that the switch 118 will be actuated when the button 104 is depressed. The switch 118 will move the button 104 back to a neutral position when released.

The rocker button 106 is molded from a suitable plastic such as Capron 8267, and has a main body portion 120 and a pair of actuator prongs 122A, 122B spaced apart to align each prong with a respective switch 116A, 116B.

The body portion 120 has a partially spherical protuberance 121A, 121B on a respective slot sidewall 109A, 109B, which are sized and spaced to be snap fit with a respective partially spherical seat 124A, 124B which are aligned with each other to define a pivot axis.

The seats 124A, 124B are recessed into the side walls 109A, 109B defining the slot 108 extending through the side of the knob casing 92 sized to slidably receive the rocker button 106 with sufficient clearance to allow rocking of the rocker button 106.

The sidewalls 126A, 126B of the rocker button 106 are bounded by spaces 127A, 127B (FIG. 19) included to create some "give" allowing the body portion 120 sidewalls 126A, 126B to be compressed inwardly to allow the protuberances 121A, 121B to be moved in slightly as the rocker button 106 is inserted into the slot 108 until the protuberances 121A, B are seated in the seats 124A, 124B.

The body portion 120 is also formed with an arcuate stiffening web 130 extending between the actuator prongs 122A, 122B to add rigidity.

The outer surface 131 is sloped to generally conform with the outside taper of the knob casing 92.

Figure 19:
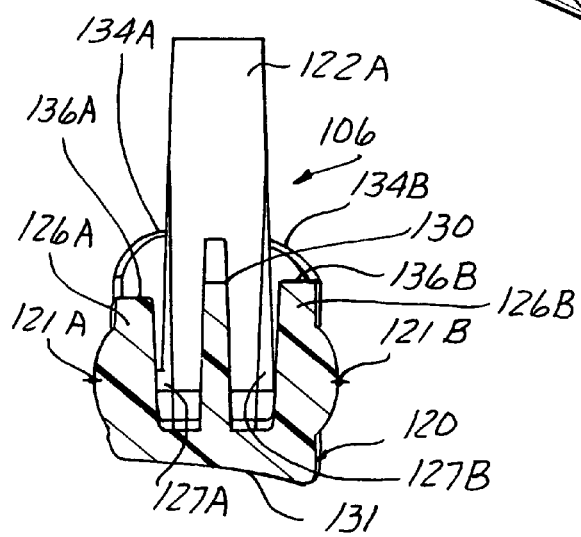
FIG. 19 is a view of the section 19-19 taken in FIG. 18.
Figure 18:
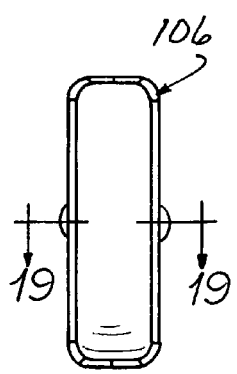
FIG. 18 is an enlarged top view of the rocker button shown in FIGS. 16 and 17.
Figure 20:
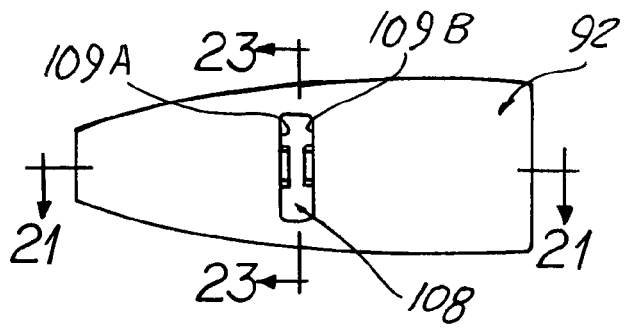
FIG. 20 is a side view of the knob casing shown in FIGS. 14 and 15.
Figure 21:
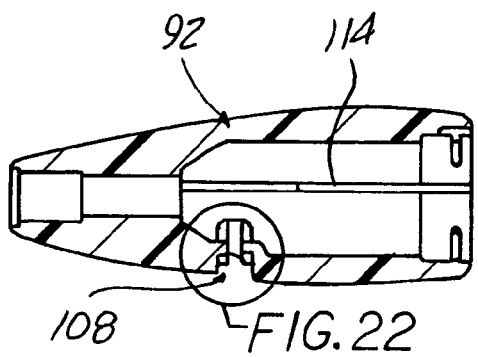
FIG. 21 is a view of the section 21-21 taken in FIG. 20.
Figure 22:
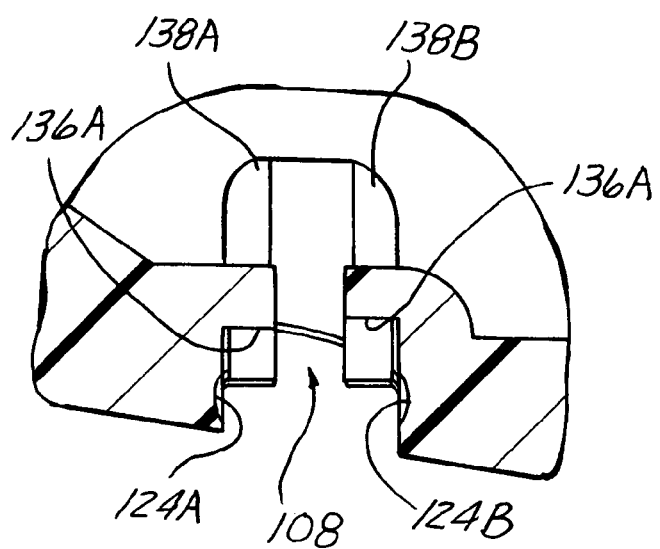
FIG. 22 is an enlarged view of the area in circle 22 in FIG. 21.
Figure 23:
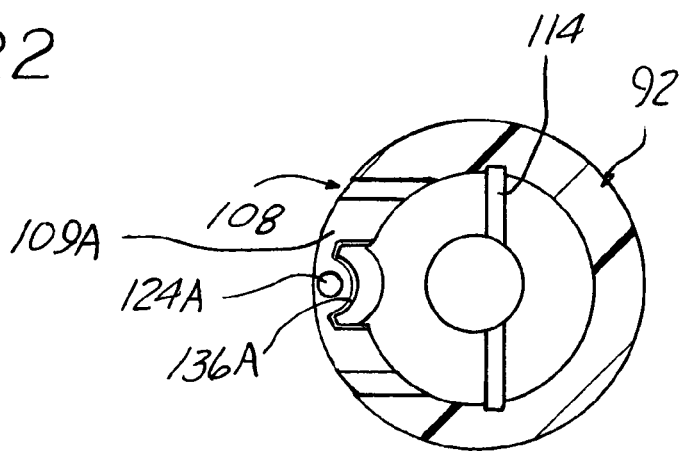
FIG. 23 is an enlarged view of the section 23-23 taken in FIG. 20.
Figure 24:
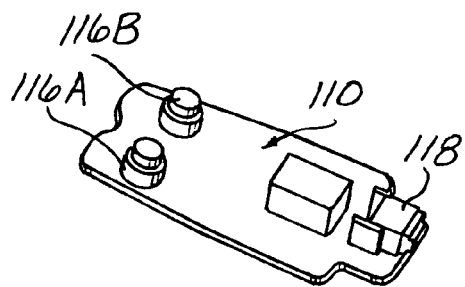
FIG. 24 is a pictorial view of a circuit board included in the third embodiment of the present invention.
Figure 26:
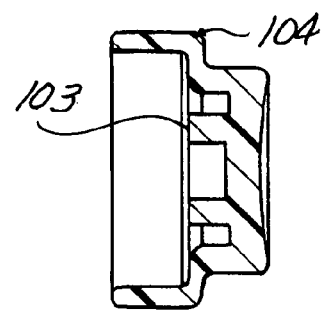
FIG. 26 is an enlarged sectional view of the overdrive on-off push button included in the third embodiment of the present invention.

Arcuate surfaces 132A, 132B, 134 are molded into the outside of each rocker button sidewall 126A, 126B which are complementary to arcuate surfaces 136A, 136B, 138A, 138B molded into the knob casing 92. The surfaces 136A, 138A are a symmetric with surfaces 136B, 138B as seen in FIG. 19 as are surfaces 136A, 138A with surfaces 136B, 138B. This insures correct assembly of the rocker button 106 as these surfaces will not be properly nested if the rocker button 106 is attempted to be assembled in a reverse orientation.

It is noted that the arcuate surfaces 132A, 132B, 134A, 134B and 136A, 136B, 138A, 138B are not normally in contact to allow free pivoting. Only if the rocker button 106 is pressed firmly do these surfaces make contact, acting as a stop preventing the same from moving into too firm engagement with the switches 116A, 116B.

Figure 25:
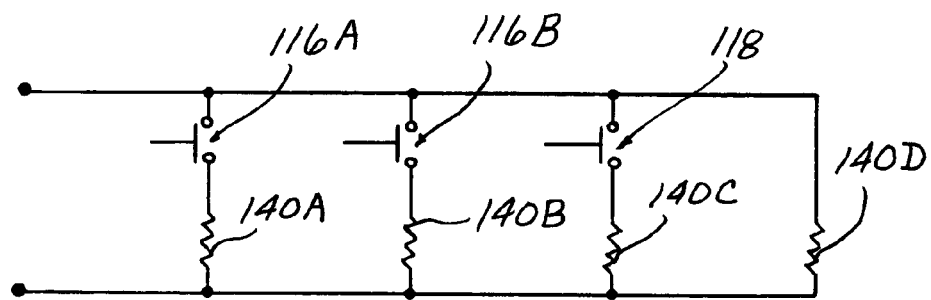
FIG. 25 is a schematic view of the switch coding circuitry included in the third embodiment of the present invention.
Figure 27:
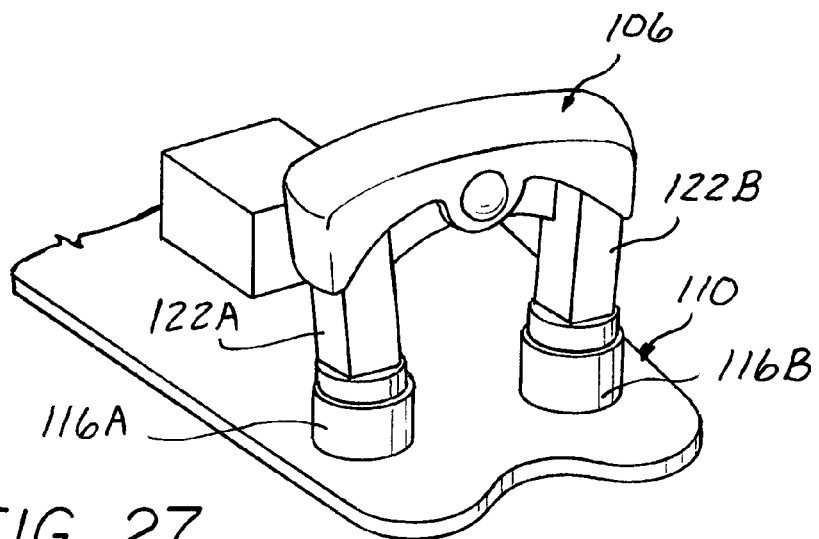
FIG. 27 is a pictorial view of the circuit board with the rocker button and end cap included in the third embodiment of the present invention.
Figure 28:
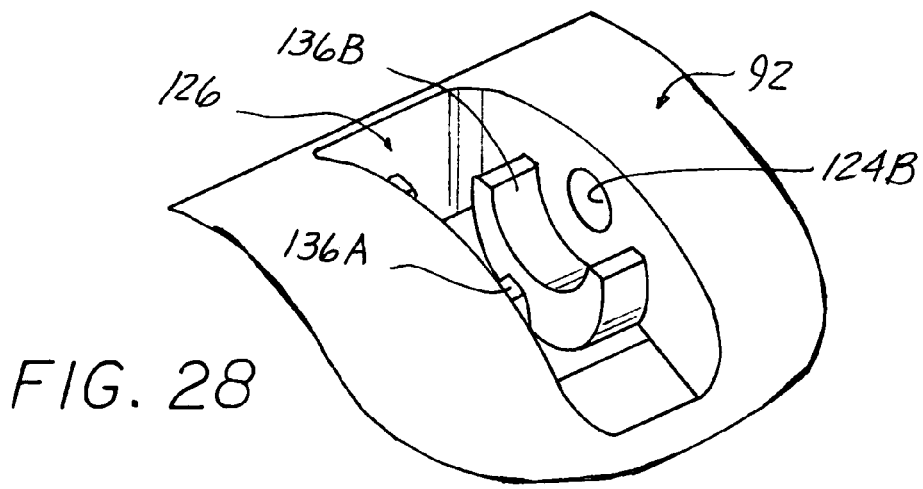
FIG. 28 is an enlarged fragmentary pictorial view of a portion of the knob casing of the third embodiment of the present invention showing features guiding the rocker button.
Figure 29:
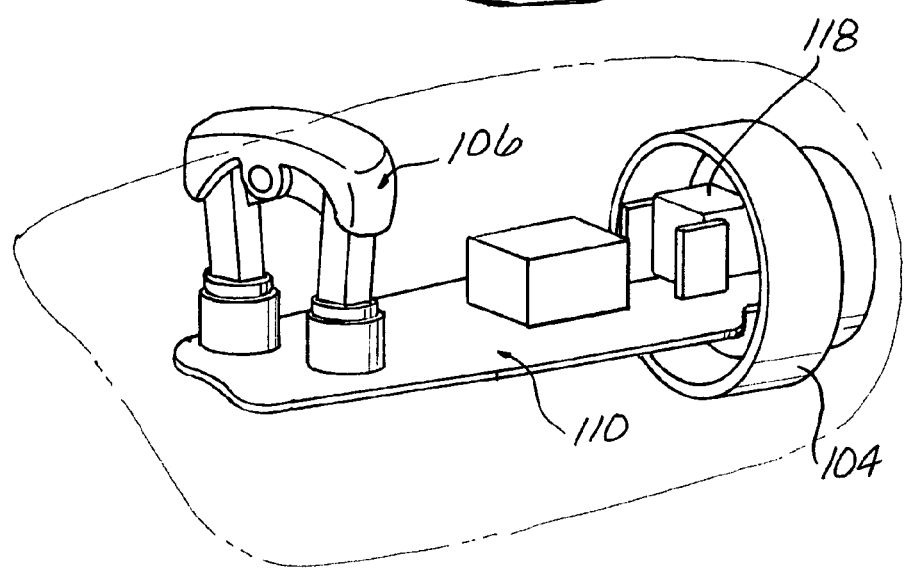
FIG. 29 is a pictorial view of the internal components of the third embodiment of the invention.
Figure 30:
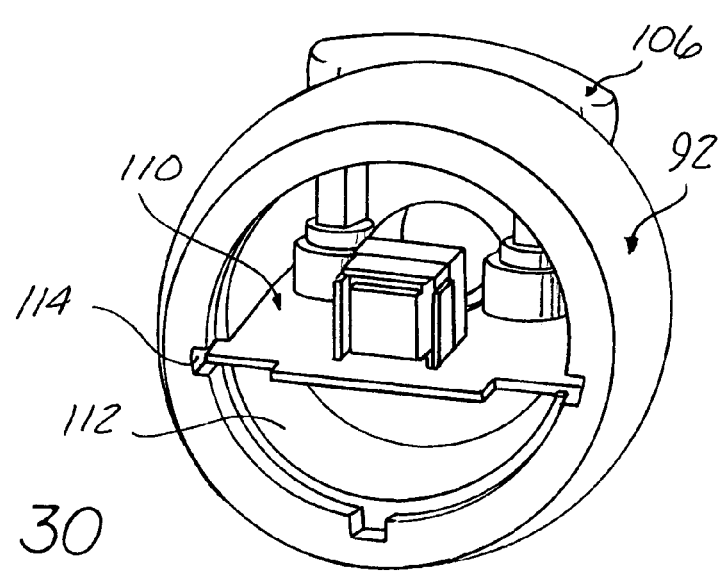
FIG. 30 is a pictorial view of one end of the knob casing of the third embodiment of the present invention with the end cap removed to show the internal components.

FIG. 25 is a schematic diagram showing a series of resistors 140A, 140B, 140C associated with a respective switch 116A, 116B, 118.

A fourth resistor 140D is connected across the leads to all of these switches. Each of these resistors has a unique ohm value, i.e., 13.0 K, 4.99 K, 3.01 K and 21.5 K ohm.

This allows a single pair of leads to be used so that the logic circuitry 98 can detect four conditions, i.e., each of the switches 116A, 116B or 118 open or closed, or all being open by the current level flowing through the circuit. Upon being decoded by the signal processing logic 98, this enables the desired transmission function to be activated.

Thus, a single switch assembly when connected can carry out three functions, to lower manufacturing costs.

The invention claimed is:

1. In combination, a multifunctional switching arrangement mounted to a knob casing attached at one end to a lever adapted to be mounted to a steering column, said switching arrangement comprised of a single switch assemblage having at least two switches mounted within said knob casing, a pivotal rocker button accessible from the exterior of said knob casing drivingly engaging said two switches to so as to enable each of said two switches to be selectively operated by pivoting movement of said rocker button in either direction;

said knob casing having an opening formed therein; said rocker button having a body portion insertable into said knob casing opening, said body portion further having pivot retention features snap fit to pivot retention features on said knob casing adjacent said opening upon insertion of said body portion into said opening to retain said rocker button therein and provide a pivotal mount therefore.

2. The combination according to claim 1 wherein said combination also includes a push button recessed into an end opening of said knob casing and operating a third of said plurality of switches by a driving connection therebetween.

3. The combination according to claim 2 wherein said switching arrangement is combined with a motor vehicle transmission control to cause a shift up or down upon movement of said rocker button operating said two of said switches and to activate or deactivate an overdrive of said transmission by operating said third switch.

4. The combination according to claim 2 wherein said three switches and said push button are housed in a tubular casing to form said switch assemblage inserted in said knob casing.

5. The combination according to claim 1 further including a push button recessed into an end opening of said knob casing and operating a third of said plurality of switches by a driving connection therebetween.

6. The combination according to claim 1 wherein said rocker button has two prongs each engaged with a respective one of said two switches to be alternatively operated upon said rocker button being pivoted in either direction.

7. The combination according to claim 1 wherein said rocker button is formed with a body portion with two prongs which project from said body portion into an interior space in said knob casing when inserted therein, said body portion further having a protuberance on a each side of said body portion comprising said pivot retention features, said knob casing opening having opposite sides, each side formed with a seat comprising said pivot retention features fit to a respective protuberance which is received therein when said rocker button is inserted into said opening to thereby create a pivotal mount for said rocker button and to retain said rocker button in said knob casing opening.

8. The combination according to claim 7 wherein said opening sides are configured to be able to be together deflected to accommodate said protuberances which snap back out upon seating of said protuberances in said seats.

9. The combination according to claim 8 wherein said body portion is formed with adjacent spaces to increase deflectability of said sides inwardly.

10. The combination according to claim 7 wherein said rocker button body portion is formed with arcuate side contours received into arcuate contours on said opening sides when said rocker switch is inserted therein.

11. The combination according to claim 10 wherein said arcuate contours do not normally contact each other until said rocker switch is pressed beyond a predetermined force level.

12. The combination according to claim 11 wherein a said knob casing is of one piece construction.

* * * * *